(12) United States Patent
Kim et al.

(10) Patent No.: US 7,489,664 B2
(45) Date of Patent: Feb. 10, 2009

(54) METHOD AND APPARATUS FOR TRANSMITTING AND RECEIVING ORTHOGONAL CODE INDEX INFORMATION IN A MOBILE COMMUNICATION SYSTEM

(75) Inventors: Youn-Sun Kim, Seoul (KR); Ho-Kyu Choi, Songnam-shi (KR); Hwan-Joon Kwon, Seoul (KR); Dong-Hee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1080 days.

(21) Appl. No.: 10/295,816

(22) Filed: Nov. 15, 2002

(65) Prior Publication Data

US 2003/0095499 A1  May 22, 2003

(30) Foreign Application Priority Data

Nov. 16, 2001  (KR)  .............. 10-2001-0071528

(51) Int. Cl.
*H04J 11/00* (2006.01)
*H04B 7/216* (2006.01)
*H04L 12/50* (2006.01)

(52) U.S. Cl. .............. 370/335; 370/208; 370/209; 370/384

(58) Field of Classification Search .............. 370/203, 370/208, 209, 318, 320, 335, 342, 395.4, 370/410, 431, 432, 438, 437, 328, 329, 332, 370/395.1, 394, 384, 468

See application file for complete search history.

(56) References Cited

U.S. PATENT DOCUMENTS

| 4,882,579 | A  | * | 11/1989 | Siwiak ............... 340/7.23 |
| 5,583,851 | A  |   | 12/1996 | Kato et al. |
| 6,731,618 | B1 | * | 5/2004  | Chung et al. ........ 370/328 |
| 6,747,994 | B2 | * | 6/2004  | Oses et al. ......... 370/468 |
| 7,050,406 | B2 | * | 5/2006  | Hsu et al. ......... 370/320 |
| 7,088,673 | B2 | * | 8/2006  | Horne ............. 370/209 |
| 7,167,461 | B2 | * | 1/2007  | Odenwalder et al. ... 370/335 |

FOREIGN PATENT DOCUMENTS

WO    WO 00/42723    7/2000

OTHER PUBLICATIONS

European Search Report dated Apr. 1, 2003, issued in a counterpart application, namely, Appln. No. 02025608.7.

* cited by examiner

*Primary Examiner*—Hanh Nguyen
(74) *Attorney, Agent, or Firm*—The Farrell Law Firm, PC

(57) ABSTRACT

A method and apparatus for transmitting and receiving between MSs and a BS orthogonal code index information indicating orthogonal codes available to the MSs in a mobile communication system supporting multimedia services including voice and data services. The MSs are connected to the BS and receive a data service simultaneously from the BS. The BS generates the orthogonal code index information according to the forward channel states of the MSs, and transmits it to the MSs. Each of the MSs determines its assigned orthogonal codes from received orthogonal code index information.

28 Claims, 8 Drawing Sheets

METHOD AND APPARATUS FOR TRANSMITTING AND RECEIVING ORTHOGONAL CODE INDEX INFORMATION IN A MOBILE COMMUNICATION SYSTEM

PRIORITY

This application claims priority to an application entitled "Method and Apparatus for Transmitting and Receiving Orthogonal code index information in a Mobile Communication System" filed in the Korean Industrial Property Office on Nov. 16, 2001 and assigned Serial No. 2001-71528, the contents of which are hereby incorporated by reference.

BACKGROUND OF THE INVENTION

1. Field of the Invention

The present invention relates generally to a mobile communication system supporting multimedia services including data and voice services, and in particular, to a method and apparatus for transmitting and receiving between a base station (BS) and a mobile station (MS) information about the available orthogonal codes to the MS.

2. Description of the Related Art

A typical mobile communication system, for example, a CDMA (Code Division Multiple Access) mobile communication system such as an IS-2000 system supports only voice service. Growing user demands and communication technology development have resulted in the development of a mobile communication system supporting data service. The HDR (High Data Rate) system was proposed to support high-speed data service only.

Thus, existing mobile communication systems support either of voice and data services. To satisfy a need for contemporaneous provision of voice and data, a so-called 1xEV-DV (Evolution-Data and Voice) mobile communication system has been proposed.

In view of supporting only data transmission, the number and type of orthogonal codes (e.g., Walsh codes) available to a BS are fixed in HDR. However, the number and type of Walsh codes available for data service are variable depending on the absence or presence of voice service users and the number of the voice service users in 1xEV-DV. Hence a BS tells an MS about the available Walsh codes to the MS.

HDR also differs from 1xEV-DV in that only one MS receives a data service at a certain time, while two or more MSs can receive the data service simultaneously in CDM (Code Division Multiplexing) for a predetermined time period. To do so, the BS transmits to the MSs information about Walsh codes available to them in a given Walsh code index.

SUMMARY OF THE INVENTION

It is, therefore, an object of the present invention to provide a method and apparatus in a BS for transmitting to an MS information about the available orthogonal codes to the MS for a data service in a mobile communication system.

It is another object of the present invention to provide a method and apparatus in an MS for receiving information about orthogonal codes available to the MS from a BS in a mobile communication system.

To achieve the above and other objects, there are provided a method and apparatus for transmitting and receiving between an MS and a BS information about the available orthogonal codes to the MS for a data service in a mobile communication system.

According to one aspect of the present invention, a plurality of MSs are connected to a BS and the BS spreads data with different orthogonal codes assigned to the MSs for a data service and transmits the data to the MSs simultaneously for a predetermined time period in a mobile communication system. In an apparatus of the BS for transmitting orthogonal code index information indicating the available orthogonal codes, a channel state determiner determines the forward channel state of each of the MSs. A controller assigns to the MSs a predetermined number of orthogonal codes starting from the first one of orthogonal codes available for the data service in the order of bad forward channel states. A transmitter transmits to each of the MSs orthogonal code index information indicating the last one of orthogonal codes assigned to the MS.

According to another aspect of the present invention, a first MS in a relatively bad forward channel state and a second MS in a relatively good forward channel state are connected to a BS and the BS spreads data with different orthogonal codes assigned to the MSs for a data service and transmits the data to the MSs simultaneously for a predetermined time period in a mobile communication system. In an apparatus of the BS for transmitting orthogonal code index information indicating the available orthogonal codes, a channel state determiner determines the forward channel state of each of the MSs. A controller assigns to the first MS a first orthogonal code group including a first predetermined number of orthogonal codes starting from the first one of orthogonal codes available for the data service, and assigns to the second MS a second orthogonal code group including a second predetermined number of orthogonal codes following the last orthogonal code of the first orthogonal code group. A transmitter transmits to the first MS first orthogonal code index information indicating the last orthogonal code of the first orthogonal code group, and transmits to the second MS second orthogonal code index information indicating the last orthogonal code of the second orthogonal code group.

According to a further aspect of the present invention, a first MS in a relatively bad forward channel state and a second MS in a relatively good forward channel state are connected to a BS and the BS spreads data with different orthogonal codes assigned to the MSs for a data service and transmits the data to the MSs simultaneously for a predetermined time period in a mobile communication system. In an apparatus for transmitting and receiving between the BS and the MSs orthogonal code index information indicating the available orthogonal codes assigned to the MSs, the BS has a channel state determiner, a controller, and a transmitter. The channel state determiner determines the forward channel state of each of the MSs, the controller assigns to the first MS a first orthogonal code group including a first predetermined number of orthogonal codes starting from the first one of orthogonal codes available for the data service, and assigns to the second MS a second orthogonal code group including a second predetermined number of orthogonal codes following the last orthogonal code of the first orthogonal code group, and the transmitter transmits to the first MS first orthogonal code index information indicating the last orthogonal code of the first orthogonal code group, and transmits to the second MS second orthogonal code index information indicating the last orthogonal code of the second orthogonal code group. The first MS has a receiver for receiving the first orthogonal code index information on the first channel and a controller for determining the first orthogonal code group. The second MS has a receiver for receiving the first orthogonal code index information on the first channel and the second orthogonal code index information on the second channel, and a controller for determining the second orthogonal code group.

According to another aspect of the present invention, a plurality of MSs are connected to a BS and the BS spreads data with different orthogonal codes assigned to the MSs for a data service and transmits the data to the MSs simultaneously for a predetermined time period in a mobile communication system. In an apparatus for transmitting and receiving between the BS and the MSs orthogonal code index information indicating the available orthogonal codes, the BS has a channel state determiner, a controller, and a transmitter. The channel state determiner determines the forward channel state of each of the MSs, the controller assigns to the MSs a predetermined number of orthogonal codes starting from the first one of orthogonal codes available for the data service in the order of bad forward channel states, and the transmitter transmits to each of the MSs the ID of the MS and orthogonal code index information indicating the last one of orthogonal codes assigned to the MS. Each of the MSs has a receiver for receiving information from the BS, and a controller for determining orthogonal codes assigned to the MS using an MS ID and orthogonal code index information included in the received information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
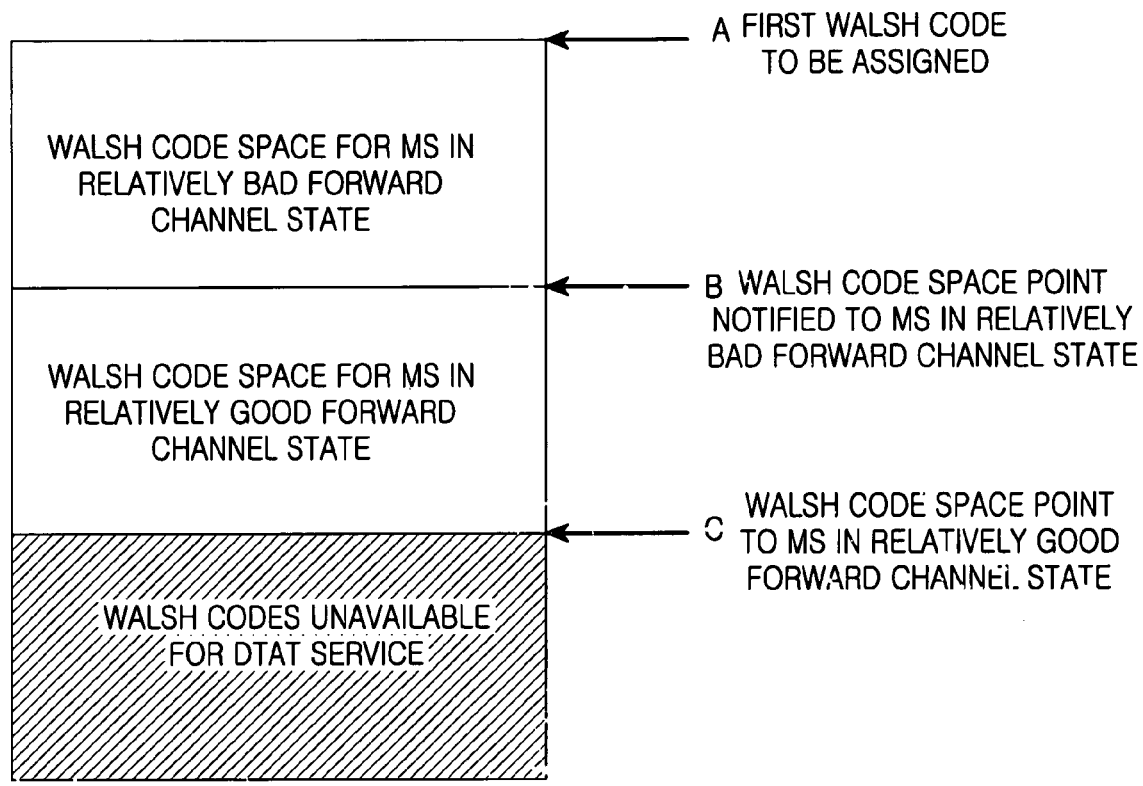
FIG. 1 illustrates a method of generating orthogonal code index information for two MSs according to the present invention.

A preferred embodiment of the present invention will be described herein below with reference to the accompanying drawings. In the following description, well-known functions or constructions are not described in detail since they would obscure the invention in unnecessary detail.

A description will be made first of the principle of the present invention and then embodiments that implement the principle. The embodiments will be considered separately as an operation in a BS and as an operation in an MS. According to the present invention, a BS is connected to at least two MSs and the MSs receive a data service simultaneously from the BS in a mobile communication system. The BS tells the MSs orthogonal codes available to them for the data service, and the MSs each determine the orthogonal codes assigned to them.

A term "Walsh code index information", directed from a BS to an MS, indicates Walsh codes available to the MS for a data service. The terms "Walsh code information" and "end of Walsh code index" are used in the same sense as "Walsh code index information". Walsh codes are an example of orthogonal codes. Therefore, the present invention is also applicable to apparatuses and methods utilizing other orthogonal codes. "Forward" is the direction from a BS to an MS and "forward channel state" denotes the state of a radio link directed from the BS to the MS.

Principle of the Present Invention

A BS transmits to an MS information about Walsh codes assigned to the MS referring to a Walsh code table such as Table 1 every time it transmits forward data. According to the following Table 1, for example, the BS uses 32-ary Walsh code for communication with the MS and there are 28 position indication indices for assigning to the MS for a data service.

TABLE 1

| 32-ary Walsh code | Position indication index |
|---|---|
| 31 | 1 |
| 15 | 2 |
| 23 | 3 |
| 7 | 4 |
| 27 | 5 |
| 11 | 6 |
| 19 | 7 |
| 3 | 8 |
| 29 | 9 |
| 13 | 10 |
| 21 | 11 |
| 5 | 12 |
| 25 | 13 |
| 9 | 14 |
| 30 | 15 |
| 14 | 16 |
| 22 | 17 |
| 6 | 18 |
| 26 | 19 |
| 10 | 20 |
| 18 | 21 |
| 2 | 22 |
| 28 | 23 |
| 12 | 24 |
| 20 | 25 |
| 4 | 26 |
| 24 | 27 |
| 8 | 28 |

Referring to Table 1, the BS assigns some of the Walsh codes to the MS for a data service and transmits information about the assigned Walsh codes to the MS. In a typical mobile communication system, the BS assigns Walsh codes starting from the last index for a service other than a data service. For the data service, therefore, the BS starts with the first Walsh code in assigning Walsh codes and tells the MS a position indication index indicating the last one of the assigned Walsh codes. That is, Walsh codes starting from the first Walsh code and ending with a Walsh code corresponding to the index are available to the MS. For example, if Walsh code #31 (position indication index 1), Walsh code #15 (position indication index 2), Walsh code #23 (position indication index 3), Walsh code #7 (position indication index 4), and Walsh code #27 (position indication index 5) are available to the MS, the BS transmits Walsh code index information indicating the position indication index 5 to the MS. The MS then determines that its Walsh codes for the data service are of position indication indexes 1 to 5.

The above method of transmitting Walsh code index information is effective if the data service is provided to only one MS for a predetermined time period. When two or more MSs simultaneously receive the data service in CDM using their Walsh codes, the BS must notify them of their assigned Walsh codes in a different manner. Specifically, the BS notifies one of the MSs of the end of its assigned Walsh codes starting from the first Walsh code in a given Walsh code index information and each of the other MSs of the start and end of their assigned Walsh codes. According to the present invention, the BS notifies the MSs of their assigned Walsh codes according to their forward channel states, as follows.

On the assumption that two MSs receive the data service in CDM simultaneously, the BS tells one of the MSs at a relatively bad forward channel state the position indication index of the end of its assigned Walsh codes starting from the first Walsh code in the Walsh code index information and the other MS at a relatively good forward channel state the position indication index of the end of its assigned Walsh codes (i.e., the last Walsh code in the Walsh code index information due to data transmission to two MSs). Notably, the latter additionally receives the Walsh code information for the former. As a result, the MS at the good forward channel state can find out the start and end of its assigned Walsh codes. In order to maintain the reception power of Walsh code information at each MS, greater transmission power is assigned to the Walsh code information for the MS at the bad forward channel state than the Walsh code information for the MS at the good forward channel state.

Each of the MSs determines whether it is at a bad or good forward channel state by detecting a Walsh code with which its Walsh code information is orthogonally spread. Since the BS transmits to the MS the Walsh code information and a MAC ID (Medium Access Control Identifier) together in control information after orthogonal spreading, the MS can determine whether the Walsh code information is destined for it and whether it is at a bad or good forward channel state.

For example, if its Walsh code information is spread with a Walsh code A, a first MS determines that it is at a relatively bad forward channel state and that Walsh codes starting from the first Walsh code (#31 in Table 1) in the Walsh code space and ending with a Walsh code corresponding to a position indication index set in the Walsh code information are available. On the other hand, if its Walsh code information is spread with a Walsh code B, a second MS determines that it is at a relatively good forward channel state and that Walsh codes starting from the Walsh code following the Walsh code set in the Walsh code information for the first MS and ending with a Walsh code corresponding to a position indication index set in the received Walsh code information are available.

FIG. 1 illustrates a method of generating orthogonal code index information for two MSs when they simultaneously receive a data service in CDM according to the present invention. Referring to FIG. 1, a BS transmits to each MS Walsh code information indicating the end of its assigned Walsh codes. Each MS then determines its assigned Walsh codes for the data service according to a Walsh code used to orthogonally spread the received Walsh code information. For example, if its received Walsh code information is spread with a Walsh code for a bad forward channel state, a first MS determines that its Walsh codes available for the data service start from the first Walsh code (point A) in the total Walsh code index information and end with a Walsh code (point B) indicated by the Walsh code information. On the other hand, if its received Walsh code information is spread with a Walsh code for a good forward channel state, a second MS determines that its Walsh codes available for the data service start from the Walsh code following the Walsh code (point B) indicated by the Walsh code information for the first MS and end with a Walsh code (point C) indicated by the received Walsh code information.

Figure 2:
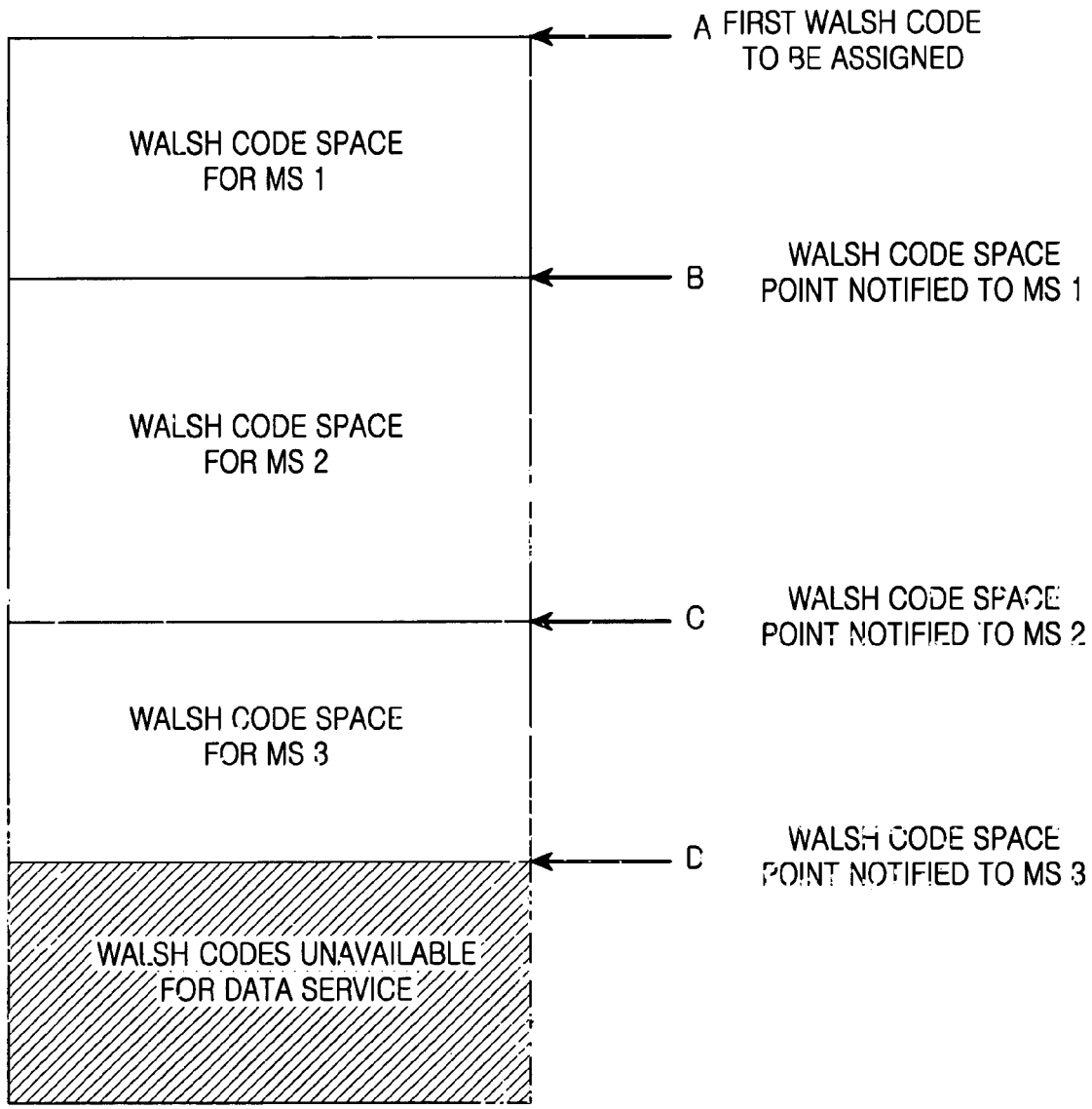
FIG. 2 illustrates a method of generating orthogonal code index information for three MSs according to the present invention.

FIG. 2 illustrates a method of generating orthogonal code index information for three MSs when they simultaneously receive a data service in CDM according to the present invention. Referring to FIG. 2, a BS transmits to each MS Walsh code information indicating the end of its assigned Walsh codes. Each MS then determines Walsh codes available to it for the data service according to a Walsh code used to orthogonally spread the received Walsh code information. For example, if its received Walsh code information is spread with a Walsh code for the worst bad forward channel state, a first MS determines that its Walsh codes available for the data service start from the first Walsh code (point A) in the total Walsh code index information and end with a Walsh code (point B) indicated by the Walsh code information. If its received Walsh code information is spread with a Walsh code for the second to worst forward channel state, a second MS determines that its available Walsh codes available for the data service start from the Walsh code following the Walsh code (point B) indicated by the Walsh code information for the first MS and end with a Walsh code (point C) indicated by the received Walsh code information. If its received Walsh code information is spread with a Walsh code for the best forward channel state, a third MS determines that its available Walsh codes available for the data service start from the Walsh code following the Walsh code (point C) indicated by the Walsh code information for the second MS and end with a Walsh code (point D) indicated by the received Walsh code information.

Embodiments Of The Present Invention

Figure 3:
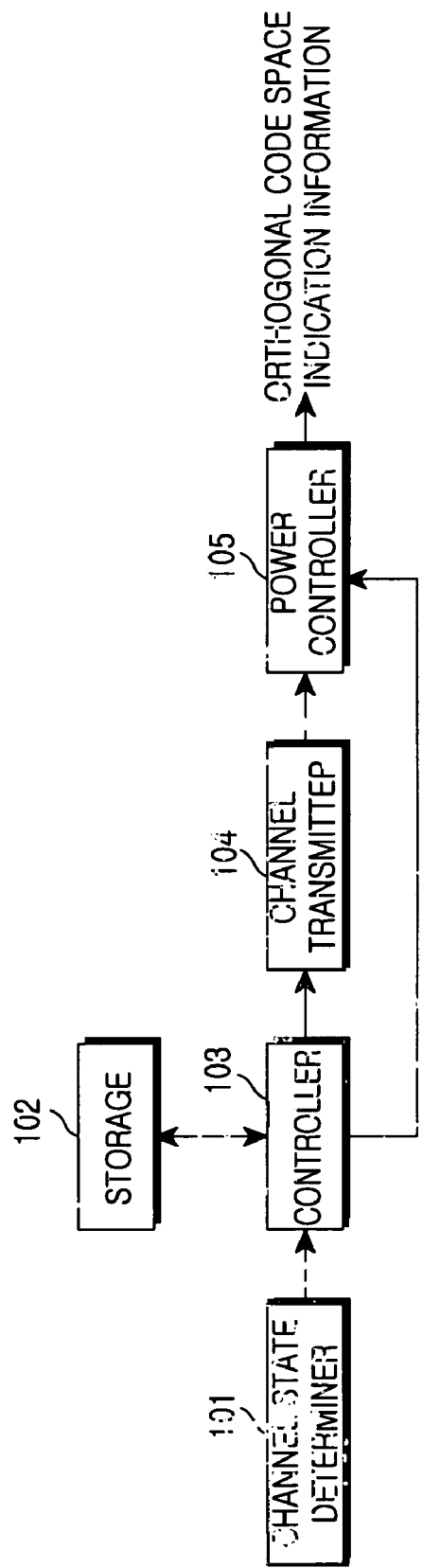
FIG. 3 is a block diagram of an apparatus for generating orthogonal code index information according to an embodiment of the present invention.

FIG. 3 is a block diagram of an apparatus for generating orthogonal code index information according to an embodiment of the present invention. The apparatus is provided in a BS to transmit to a plurality of MSs information about orthogonal codes assigned to them for a data service so that they simultaneously receive the data service in CDM from the BS in a mobile communication system.

Referring to FIG. 3, the apparatus for generating orthogonal code index information includes a channel state determiner 101, a storage 102, a controller 103, a channel transmitter 104, and a power controller 105. The channel state determiner 101 determines the forward channel states of the MSs. The storage 102 stores information about orthogonal codes available to the BS, such as Table 1. The controller 103 sequentially assigns a predetermined number of orthogonal codes starting from the first orthogonal code to the MSs in the order of bad channel states ranked worst, second to worst, etc. The channel transmitter 104 transmits to each of the MSs orthogonal code index information indicating the end of its assigned Walsh codes under the control of the controller 103. The power controller 105 controls the transmission power of the orthogonal code index information so that an MS at a bad channel state receives orthogonal code index information with greater power than an MS at a good channel state.

Figure 5:
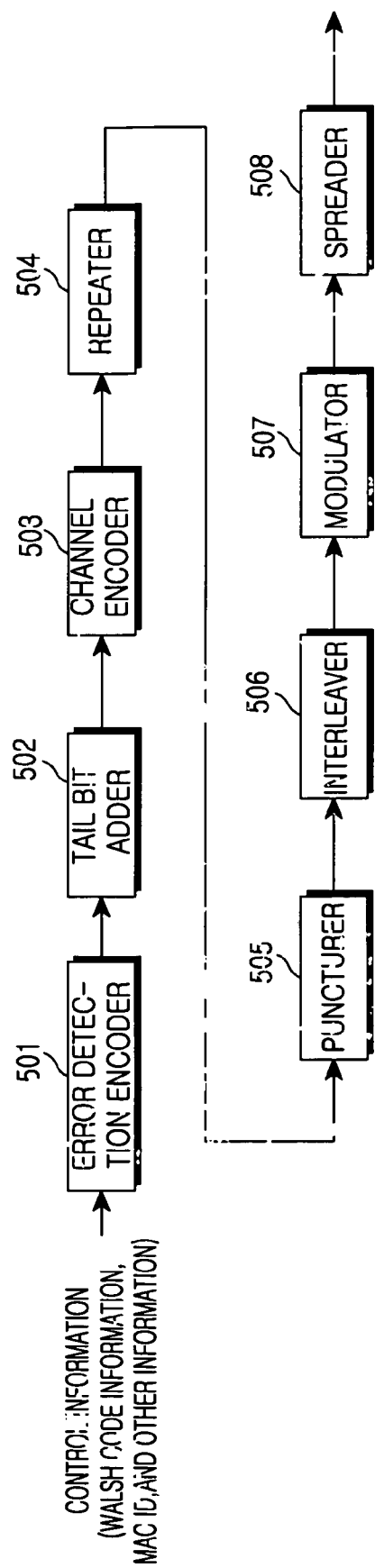
FIG. 5 is a detailed block diagram of the channel transmitter illustrated in FIG. 3.

FIG. 5 is a detailed block diagram of the channel transmitter 104 illustrated in FIG. 3. The channel transmitter 104 transmits a forward control channel with control information containing Walsh code information.

Referring to FIG. 5, the BS transmits a MAC ID identifying an MS, Walsh code information for the MS, and other control information on a forward control channel. If Walsh codes of length 32 are used for a data service as in Table 1, the Walsh code information, that is, Walsh code space indication information can be formed in 5 bits. An error detection encoder 501 error-detection-encodes the control information of the forward control channel. The error detection encoding refers to encoding the control information, for example, by adding CRC (Cyclic Redundancy Code) bits, prior to transmission, so that an MS can determine whether the control information has errors by doing a CRC check. A tail bit adder 502 adds tail bits to the output of the error detection encoder 501. A channel encoder 503 encodes tail bit-attached symbols. A repeater 504 and a puncturer 505 repeat and puncture code symbols received from the channel encoder 503. An interleaver 506 interleaves the punctured symbols, and may comprise a block interleaver. The interleaved symbols are modulated in a modulator 507 and orthogonally spread with a predetermined Walsh code in an orthogonal spreader 508. The symbols are then sent to power controller 105.

Figure 4:
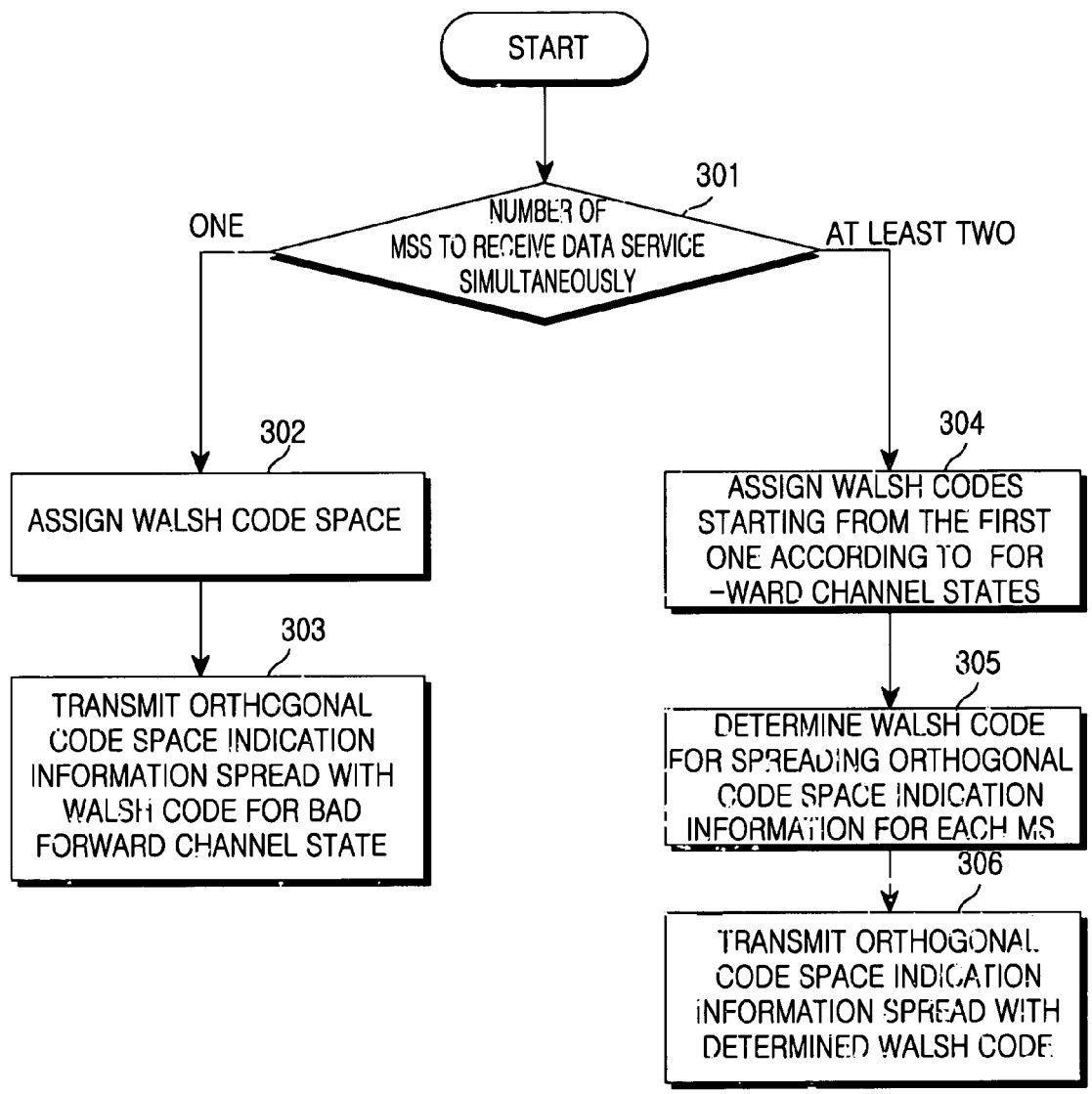
FIG. 4 is a flowchart illustrating an operation for generating orthogonal code index information and transmitting it to MSs in a BS according to the embodiment of the present invention.

FIG. 4 is a flowchart illustrating an operation in a BS for generating orthogonal code index information and transmitting it to MSs when the MSs simultaneously receive a data service in CDM using their assigned orthogonal codes (e.g., Walsh codes) according to the embodiment of the present invention.

Referring to FIG. 4, the BS determines the number of MSs that will simultaneously receive a data service in CDM for a predetermined time period and the number of Walsh codes to be assigned to each of the MSs in step 301. If only one MS is to receive the data service, the BS determines Walsh codes to be assigned to the MS at step 302 and transmits to the MS Walsh code information indicating the last one of the assigned Walsh codes in step 303. The Walsh code information is spread with a Walsh code for a bad forward channel state prior to the transmission.

If at least two MSs are to receive the data service simultaneously, the BS assigns Walsh codes for the data service to the MSs according to their forward channel states in steps 304 and 305. As stated before, Walsh codes to be assigned for the data service and a Walsh code for spreading Walsh code information are determined according to the forward channel state of an MS. Walsh code information is determined first for an MS at the worst forward channel state. The Walsh code information indicates the end of a Walsh code index information starting from the first Walsh code, assigned to the MS. Walsh code information for an MS at the second to worst forward channel state indicates the end of a Walsh code index information assigned to the MS, following the last Walsh code assigned to the MS at the worst forward channel state. In the same manner, Walsh code information for the other MSs is determined. In step 306, the BS spreads the Walsh code information for each of the MSs with a Walsh code determined according to its forward channel state and transmits it to the MSs.

Figure 6:
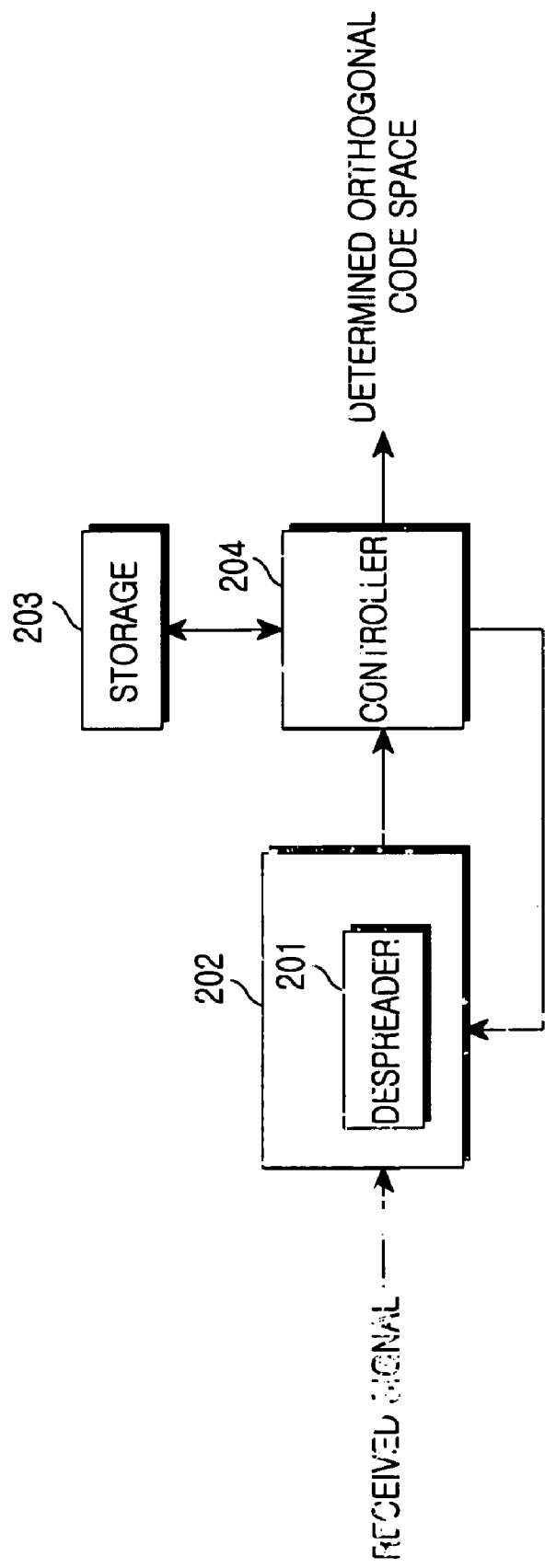
FIG. 6 is a block diagram of an orthogonal code index determining apparatus according to the embodiment of the present invention.

FIG. 6 is a block diagram of an apparatus for determining an orthogonal code index information according to the embodiment of the present invention. Each of MSs connected to a BS for simultaneously receiving a data service in CDM from the BS includes the orthogonal code index information determining apparatus.

Referring to FIG. 6, the orthogonal code index information determining apparatus includes a channel receiver 202, a storage 203, and a controller 204. The channel receiver 202 including a despreader 201 receives orthogonal code index information from the BS and processes it. The storage 203 stores information about orthogonal codes available to the BS, such as Table 1. The controller 204 primarily detects the last one of orthogonal codes assigned to the MS from the orthogonal code index information by its MAC ID, secondarily detects a Walsh code preceding the primarily detected Walsh code from the orthogonal code index information, and determines that Walsh codes starting from a Walsh code following the secondarily detected Walsh code and ending with the primarily detected Walsh code are available to the MS for the data service. Here, the MAC ID is received along with the orthogonal code index information from the BS. If the first Walsh code listed in the stored orthogonal code table is available to the MS, the controller 204 determines that the Walsh codes for the data service are from the first Walsh code to the primarily detected Walsh code.

Figure 8:
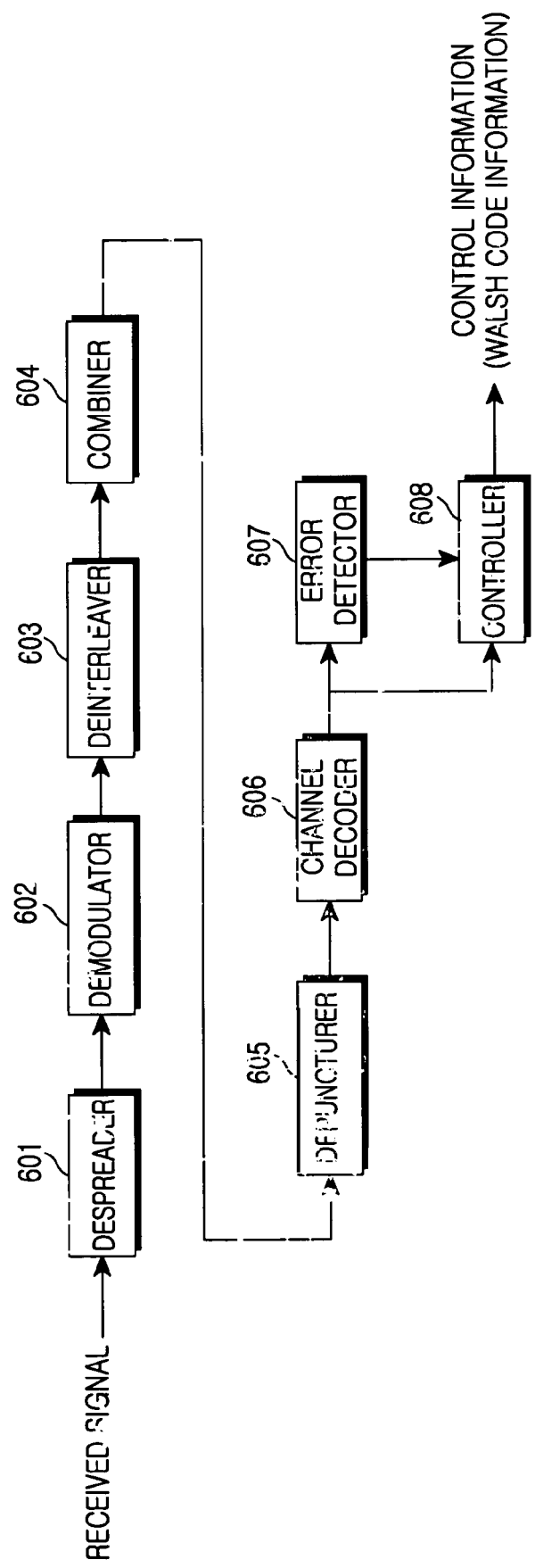
FIG. 8 is a detailed block diagram of the channel receiver illustrated in FIG. 6.

FIG. 8 is a block diagram of the channel receiver 202 illustrated in FIG. 6. The channel receiver 202 is the counterpart of the channel transmitter illustrated in FIG. 5.

Referring to FIG. 8, a received signal is despread in a despreader 601, demodulated in a demodulator 602, and deinterleaved in a deinterleaver 603, which may comprise a block deinterleaver. The de-interleaved symbols are combined in a combiner 604, depunctured in a depuncturer 605, and decoded in a channel decoder 606. An error detector 607 checks for errors in the decoded symbols. If the symbols are normal, a controller 608 extracts Walsh code information from the symbols.

Figure 7:
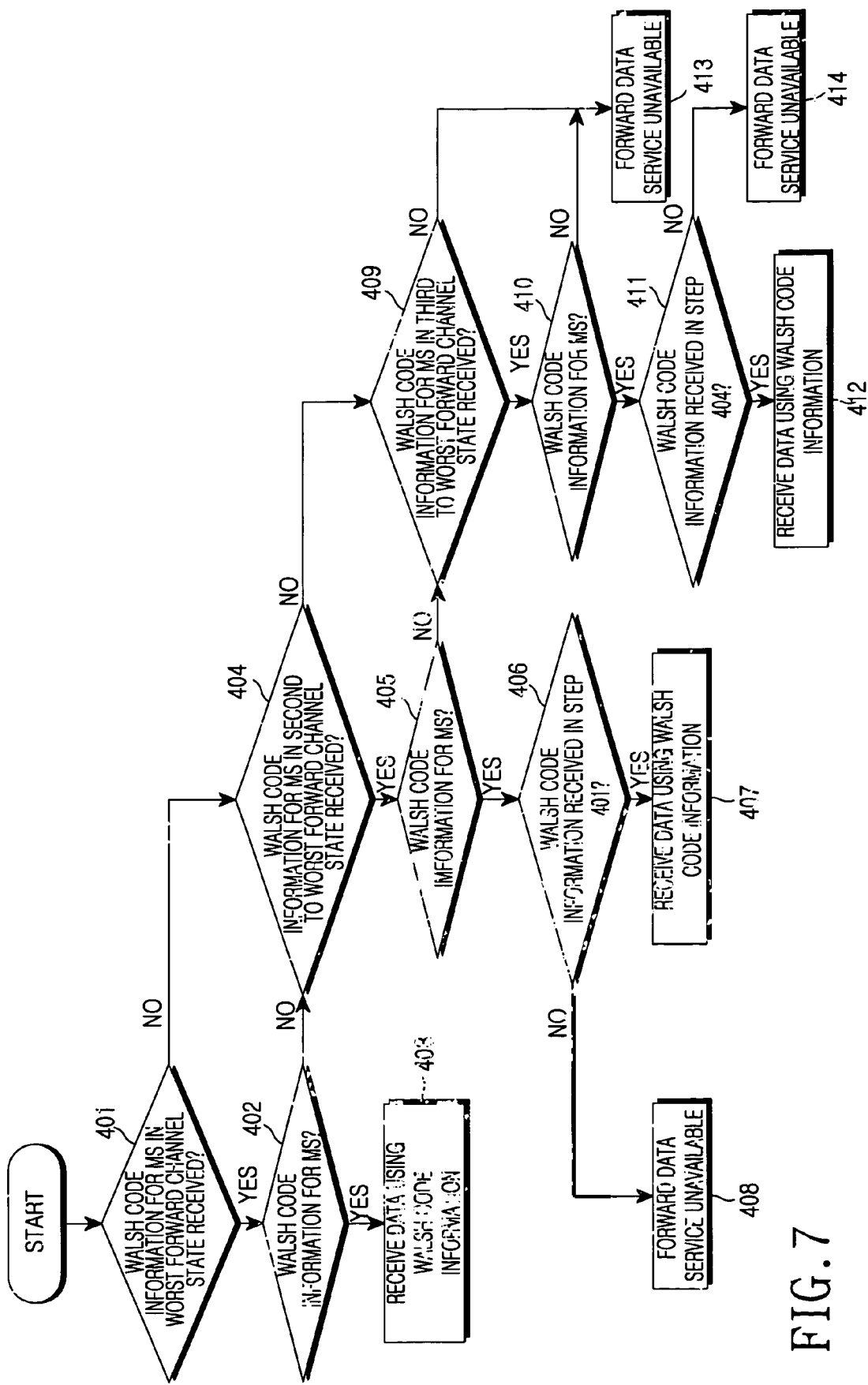
FIG. 7 is a flowchart illustrating an operation for receiving orthogonal code index information from a BS and determining its available orthogonal codes in an MS according to the embodiment of the present invention.

FIG. 7 is a flowchart illustrating an operation in an MS for receiving orthogonal code index information from a BS and determining available orthogonal codes when at least two MSs simultaneously receive a data service in CDM from the BS using their assigned orthogonal codes according to the embodiment of the present invention.

Referring to FIG. 7, the MS attempts to receive Walsh code information using a Walsh code for the worst forward channel state and determines by a CRC check whether the Walsh code information has been received in step 401. If the Walsh code information for the worst forward channel state has been received, the MS determines whether the Walsh code information is for it by checking a MAC ID received together with the Walsh code information in step 402. If the Walsh code information is for the MS, the MS determines that Walsh codes available to the MS start from the first Walsh code of the total Walsh code index information and end with a Walsh code set in the Walsh code information, and receives the data service using the Walsh codes in step 403.

If the Walsh code information for the worst forward channel state has not been received in step 401, or if the Walsh code information is not for the MS in step 402, the MS attempts to receive Walsh code information using a Walsh code for the second to worst forward channel state and determines by a CRC check whether the Walsh code information has been received in step 404. It means that the second to worst forward channel state is in better state than that of the worst forward channel. If the Walsh code information for the second to worst forward channel state has been received, the MS determines whether the Walsh code information is for it by checking a MAC ID received together with the Walsh code information in step 405. If the Walsh code information is for the MS, the MS determines whether the Walsh code information for the worst forward channel state has been received in step 406. If it has, the MS determines that Walsh codes available to the MS start from a Walsh code following the Walsh code set in the Walsh code information for the worst channel state and end with a Walsh code set in the Walsh code information for the second to worst channel state, and receives the data service using the Walsh codes in step 407. On the contrary, if the Walsh code information for the second to worst channel state is for the MS in step 405 but the Walsh code information for the worst channel state has not been received in step 401, the MS gives up attempting to receive the data service for a predetermined time period, determining that it cannot receive the data service transmitted by the BS, and that the forward data service is unavailable in step 408.

If the Walsh code information for the second to worst forward channel state has not been received in step 404, or if the Walsh code information is not for the MS in step 405, the MS attempts to receive Walsh code information using a Walsh code for the third to worst forward channel state and determines by a CRC check whether the Walsh code information has been received in step 409. It means that the third to worst forward channel state is in better state than that of the second to worst forward channel. If the Walsh code information for the third to worst forward channel state has been received, the MS determines whether the Walsh code information is for it by checking a MAC ID received together with the Walsh code information in step 410. If the Walsh code information is for the MS, the MS determines whether the Walsh code information for the second to worst forward channel state has been received in step 411. If it has, the MS determines that Walsh codes available to the MS start from a Walsh code following the Walsh code set in the Walsh code information for the second to worst channel state and end with a Walsh code set in the Walsh code information for the third to worst channel state, and receives the data service using the Walsh codes in step 412. On the contrary, if the Walsh code information for the third to worst channel state is for the MS in step 410 but the Walsh code information for the second to worst channel state has not been received in step 404, the MS gives up attempting to receive the data service for the predetermined time period, determining that it cannot receive the data service transmitted by the BS, and that forward data service is unavailable in step 414. In addition, if the Walsh code information for third to worst channel state for the MS is not received in step 409, or if it has been received but is not for the MS in step 410, the MS gives up attempting to receive the data service for the predetermined time period, determining that forward data service is unavailable in step 413.

While the above procedure is for up to three MSs that receive a data service simultaneously, it can be expanded if three or more MSs receive the data service. The orthogonal code index information determining procedure is performed in the principle that Walsh code information indicates the last one of Walsh codes assigned to a particular MS. To find out its Walsh codes, the MS receives its Walsh code information and Walsh code information for another MS at a forward channel state worse than that of the MS and determines the first and last of the Walsh codes. If the BS provides a list of Walsh codes like Table 1 to the MS, the MS determines the first and last of its assigned Walsh codes as follows.

The first one of Walsh codes assigned to an MS at the worst forward channel state: the first Walsh code in the total Walsh code index information for the data service;

the last one of Walsh codes assigned to the MS at the worst forward channel state: a Walsh code set in Walsh code information spread with a Walsh code for the worst forward channel state;

the first one of Walsh codes assigned to an MS at the Nth to worst forward channel state: the Walsh code following a Walsh code set in Walsh code information spread with a Walsh code for an (N-1)th to worst forward channel state; and the last one of Walsh codes assigned to the MS at the nth to worst forward channel state: a Walsh code set in Walsh code information spread with a Walsh code for the Nth to worst forward channel state.

A Walsh code for a particular forward channel state is a Walsh code with which to spread Walsh code information directed to an MS in the particular forward channel state. Walsh code information indicates a particular point in Table 1, as described before.

According to the embodiment of the present invention, the BS and the MS each have a list of orthogonal codes such as Table 1 and the BS sets in the Walsh code information a Walsh code index in the left column or a position indication index in the right column of Table 1.

Instead of the end of an assigned Walsh code index information, the Walsh code information may indicate the number of Walsh codes assigned to the MS. To find out its Walsh codes, an Nth MS needs Walsh code information for the first to Nth MSs. If Walsh code information for at least one of the MSs has errors, the Nth MS fails to find out its Walsh codes. On the other hand, according to the present invention, only Walsh code information for an (N-1)th MS is required. Even if errors are generated in Walsh code information for the first to (N-2)th MSs, the Nth MS can find out its Walsh codes.

In accordance with the present invention as described above, a BS transmits to MSs orthogonal code index information indicating orthogonal codes available to them for a data service. The MSs each then determine their orthogonal codes from the orthogonal code index information. The present invention is effective especially in a mobile communication system where at least two MSs receive a data service simultaneously for the same time period, since the orthogonal code information indicates only the end of an assigned orthogonal code index information.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting in a base station (BS) orthogonal code information to a plurality of mobile stations (MSs) in a mobile communication system, the orthogonal code information used by the MSs to receive a data, the method comprising the steps of:

assigning at least one orthogonal code from a plurality of orthogonal codes to a first MS, the plurality of orthogonal codes being indexed by sequential orthogonal indices;

assigning at least one orthogonal code from a plurality of orthogonal codes to a second MS, the at least one orthogonal code assigned to the second MS having a next orthogonal code index that follows a last orthogonal code index of the at least one orthogonal code assigned to the first MS;

transmitting first control information including first orthogonal code information including the last orthogonal code index of the number of orthogonal codes assigned to the first MS; and transmitting second control information including second orthogonal code information including a last orthogonal code index of the at least one orthogonal codes assigned to the second MS.

2. The method of claim 1, wherein the first control information further includes a first MAC Identifier indicating the first MS; and the second control information further includes a second MAC Identifier indicating the second MS.

3. The method of claim 1, wherein the first control information is transmitted through a first control channel and the second control information is transmitted through a second control channel.

4. The method of claim 3, wherein the forward channel state of the second MS is better than a forward channel state of the first MS.

5. The method of claim 4, wherein the second control information is transmitted with lower power than the first control information.

6. The method of claim 1, further comprising the step of, determining a forward channel state of each of the first MS and the second MS.

7. The method of claim 1, wherein the orthogonal code information is a last Walsh code index.

8. The method of claim 7, wherein the Walsh code indices are determined according to the following table

| 32-ary Walsh code | Position indication index |
|---|---|
| 31 | 1 |
| 15 | 2 |
| 23 | 3 |
| 7 | 4 |
| 27 | 5 |
| 11 | 6 |
| 19 | 7 |
| 3 | 8 |
| 29 | 9 |
| 13 | 10 |
| 21 | 11 |
| 5 | 12 |
| 25 | 13 |
| 9 | 14 |
| 30 | 15 |
| 14 | 16 |
| 22 | 17 |
| 6 | 18 |
| 26 | 19 |
| 10 | 20 |
| 18 | 21 |
| 2 | 22 |
| 28 | 23 |
| 12 | 24 |
| 20 | 25 |
| 4 | 26 |
| 24 | 27 |
| 8 | 28. |

9. An apparatus for transmitting in a base station (BS) orthogonal code information to a plurality of mobile stations (MSs) in a mobile communication system, the orthogonal code information used by the MSs to receive a data, the apparatus comprising:
   an controller for assigning at least one orthogonal code from a plurality of orthogonal codes to a first MS and at least one orthogonal code from a plurality of orthogonal codes to a second MS, the plurality of orthogonal codes being indexed by sequential orthogonal code indices and the at least one orthogonal code assigned to the second MS having a next orthogonal code index that follows a last orthogonal code index of the at least one orthogonal code assigned to the first MS; and
   an channel transmitter for transmitting first control information including first orthogonal code information including the last orthogonal code index of the at least one of orthogonal codes assigned to the first MS and second control information including second orthogonal code information including a last orthogonal code index of the at least one orthogonal codes assigned to the second MS.

10. The apparatus of claim 9, wherein the first control information further includes a first MAC Identifier indicating the first MS; and the second control information further includes a second MAC Identifier indicating the second MS.

11. The apparatus of claim 9, wherein the first control information is transmitted through a first control channel and the second control information is transmitted through a second control channel.

12. The apparatus of claim 9, further comprising a channel state determiner for determining a forward channel state of each of the first MS and the second MS.

13. The apparatus of claim 12, wherein the forward channel state of the second MS is better than the forward channel state of the first MS.

14. The apparatus of claim 13, further comprising a power controller for controlling the power of the each of the first control information and the second control information, wherein the power of the second control information is lower than a power of the first control information.

15. The apparatus of claim 9, wherein the orthogonal code information is a last Walsh code index.

16. The apparatus of claim 15, wherein the Walsh code indices are determined according to the following table

| 32-ary Walsh code | Position indication index |
|---|---|
| 31 | 1 |
| 15 | 2 |
| 23 | 3 |
| 7 | 4 |
| 27 | 5 |
| 11 | 6 |
| 19 | 7 |
| 3 | 8 |
| 29 | 9 |
| 13 | 10 |
| 21 | 11 |
| 5 | 12 |
| 25 | 13 |
| 9 | 14 |
| 30 | 15 |
| 14 | 16 |
| 22 | 17 |
| 6 | 18 |
| 26 | 19 |
| 10 | 20 |
| 18 | 21 |
| 2 | 22 |
| 2 | 22 |
| 28 | 23 |
| 12 | 24 |
| 20 | 25 |
| 4 | 26 |
| 24 | 27 |
| 8 | 28. |

17. A method for receiving a data in a receiving mobile station (MS) using orthogonal code information in a mobile communication system, the method comprising the steps of:
   receiving first control information including first orthogonal code information including a last orthogonal code index of a last orthogonal code assigned to a first MS and a first MAC Identifier indicating the first MS;
   receiving second control information including second orthogonal code information including a last orthogonal code index of a last orthogonal codes assigned to a second MS and a second MAC Identifier indicating the second MS;

determining if the first control information is for the receiving MS using the first MAC Identifier;

receiving data using the first control information if the first control information is for the receiving MS;

determining if the second control information is for the receiving MS using the second MAC Identifier, if the first control information is not for the receiving MS; and receiving data using the second control information if the second control information is for the receiving MS.

18. The method of claim 17, wherein the first control information is transmitted through a first control channel and the second control information is transmitted through a second control channel.

19. The method of claim 17, wherein a forward channel state of the second MS is better than a forward channel state of the first MS.

20. The method of claim 19, wherein the second control information is transmitted with a lower power than the first control information.

21. The method of claim 17, wherein the orthogonal code information is a last Walsh code index.

22. The method of claim 21, the Walsh code indices are determined according to the following table

| 32-ary Walsh code | Position indication index |
|---|---|
| 31 | 1 |
| 15 | 2 |
| 23 | 3 |
| 7 | 4 |
| 27 | 5 |
| 11 | 6 |
| 19 | 7 |
| 3 | 8 |
| 29 | 9 |
| 13 | 10 |
| 21 | 11 |
| 5 | 12 |
| 25 | 13 |
| 9 | 14 |
| 30 | 15 |
| 14 | 16 |
| 22 | 17 |
| 6 | 18 |
| 26 | 19 |
| 10 | 20 |
| 18 | 21 |
| 2 | 22 |
| 28 | 23 |
| 12 | 24 |
| 20 | 25 |
| 4 | 26 |
| 24 | 27 |
| 8 | 28. |

23. An apparatus for receiving a data in a receiving mobile station (MS) using orthogonal code information in a mobile communication system, the apparatus comprising:

a channel receiver for receiving first control information including first orthogonal code information including a last orthogonal code index of a last orthogonal codes assigned to a first MS and a first MAC Identifier indicating the first MS, receiving a second control information including second orthogonal code information including a last orthogonal code index of a last orthogonal codes assigned to a second MS and a second MAC Identifier indicating the second MS and receiving data using control information for the receiving MS; and the controller for determining which of the first control information and the second control information is for the receiving MS using the first MAC Identifier and the second MAC Identifier.

24. The apparatus of claim 23, wherein the first control information is transmitted through a first control channel and the second control information is transmitted through a second control channel.

25. The apparatus of claim 23, wherein a forward channel state of the second MS is better than a forward channel state of the first MS.

26. The apparatus of claim 25, wherein the second control information is transmitted with a lower power than the first control information.

27. The apparatus of claim 23, wherein the orthogonal code information is a last Walsh code index.

28. The apparatus of claim 27, the Walsh code indices are determined according to the following table

| 32-ary Walsh code | Position indication index |
|---|---|
| 31 | 1 |
| 15 | 2 |
| 23 | 3 |
| 7 | 4 |
| 27 | 5 |
| 11 | 6 |
| 19 | 7 |
| 3 | 8 |
| 29 | 9 |
| 13 | 10 |
| 21 | 11 |
| 5 | 12 |
| 25 | 13 |
| 9 | 14 |
| 30 | 15 |
| 14 | 16 |
| 22 | 17 |
| 6 | 18 |
| 26 | 19 |
| 10 | 20 |
| 18 | 21 |
| 2 | 22 |
| 28 | 23 |
| 12 | 24 |
| 20 | 25 |
| 4 | 26 |
| 24 | 27 |
| 8 | 28. |

* * * * *